United States Patent

[11] 3,545,516

[72] Inventor Albert Strelli
    Rebengasse 19, Graz, Austria
[21] Appl. No. 738,502
[22] Filed June 20, 1968
[45] Patented Dec. 8, 1970
[32] Priority June 23, 1967
[33] Austria
[31] No. A5850/67

[54] EMERGENCY TRACTION DEVICE FOR VEHICLE WHEELS
    9 Claims, 13 Drawing Figs.
[52] U.S. Cl. .................................................. 152/213,
                                                          152/227
[51] Int. Cl. ................................................. B60c 27/04
[50] Field of Search ........................................... 152/213,
    216, 225, 225(c), 226—230, 233, 241; 269/259,
                                      262, 271, 275, 280, 281, 282

[56] References Cited
    UNITED STATES PATENTS
    57,447   8/1866  Stockmar ..................... 269/280
    1,226,358  5/1917  Nace ......................... 152/225(C)
    1,435,595  11/1922  Fegely et al. ............... 269/262
    1,566,559  12/1925  Prime ........................ 152/227
    1,602,317  10/1926  Akers ........................ 152/225(C)
    1,914,760  6/1933   Stiles ........................ 152/225(C)
    2,507,090  5/1950   Brown ....................... 152/225
    2,520,260  8/1950   Robblee ..................... 152/225(C)
    3,047,037  7/1962   Frederick ................... 152/225(C)

Primary Examiner—Arthur L. LaPoint
Attorney—Karl F. Ross

ABSTRACT: A nonskid device comprises two jaws, which are engageable with the sidewalls of the tire and can be clamped against the tire with the aid of a screw, which is rotatably mounted in a carrier, which extends across the tread of the tire and carries the nonskid elements. Each of the gripping jaws is pivotally connected to the carrier with pivots mounted on opposite end portions of said carrier. One of the jaws has an extension which is engageable with the screw at a distance from the pivot of this jaw.

INVENTOR.
Albert STRELLI
BY
Karl G. Ross
Attorney

INVENTOR:
Albert STRELLI
BY
Karl F. Ross
Attorney

PATENTED DEC 8 1970

INVENTOR:
Albert STRELLI

BY

*Karl J. Ross*
*Attorney*

EMERGENCY TRACTION DEVICE FOR VEHICLE WHEELS

This invention relates to nonskid devices, particularly to nonskid devices which are designed to be simply secured to a vehicle tire and to be removed therefrom when the nonskid device is no longer required.

It is another object of the invention to provide a nonskid device which enables the vehicle to move in snow, mud and sand.

A further object of the invention is to provide a vehicle-tire nonskid device which is unitary and can be applied to the tire without assembly of a plurality of parts.

It is also an object of the invention to provide a nonskid device which can be applied to the vehicle tire even in adverse weather conditions, e.g. during snowfall, at freezing temperatures and in a storm.

Another object of the invention is to provide a nonskid device which can be secured to the tire by a single person.

It is a further object of the invention to provide a nonskid device which can easily be stowed away in a vehicle.

According to an important feature of the invention, the vehicle-tire nonskid device which comprises two jaws, which are engageable with the side walls of the tire and are to be clamped to the tire with the aid of a screw; the latter is rotatably mounted in the carrier for the nonskid elements, which carrier extends across the tread of the tire, each of said jaws being pivotally connected to the carrier for the nonskid elements by a pivot. The pivots are mounted on opposite ends of said carrier, and one of said jaws has an extension which is adapted to bear on the screw at a distance from the pivot.

It is a further feature of the invention to provide a nonskid device in which that pivoted jaw which cannot bear on the screw has an extension, which engages an abutment to limit the pivotal movement in the direction opposite to the clamping direction.

It is also a feature of the invention to provide a nonskid device in which the carrier for the nonskid elements comprises a cover plate provided with the nonskid elements.

The invention also provides a nonskid device which is prevented from tilting by a leaf spring, which is located on the inside of the carrier for the nonskid elements, this leaf spring extending transversely to the carrier and the nonskid elements and, in the peripheral direction of the tire, protruding at both ends beyond the carrier and the cover plate and is adapted to bear on the tread of the tire in operation.

I prefer to provide a nonskid device in which at least one of the gripping jaws is provided with at least one pressure member, which conforms to the side wall of the tire or is adapted to conform thereto.

The pressure member preferably consists of a vacuum cup and is provided with a pin, which is adapted to be inserted into a bore in the body of the gripping jaw.

The pressure member advantageously consists of a shoe which has a surface that conforms to the sidewall of the tire.

The invention will now be explained more fully with reference to embodiments shown by way of example in the drawing. In the drawing.

Figure 1:
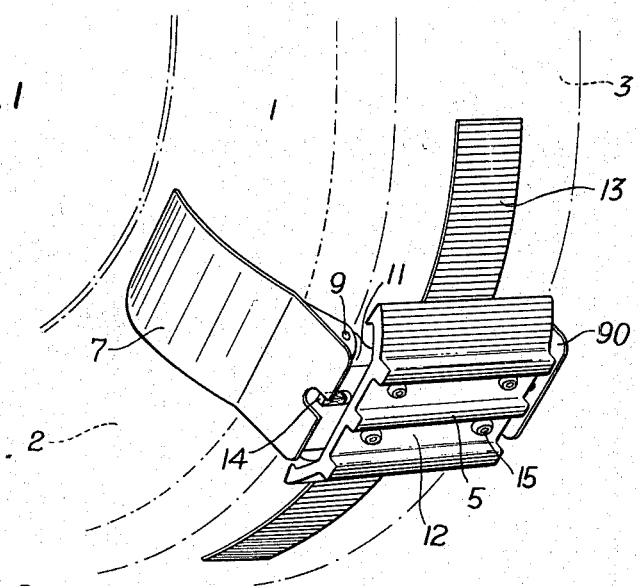
FIG. 1 is a perspective view showing a tire which is provided with a nonskid device according to the invention; only one nonskid device is mounted on the periphery of the tire although a plurality of nonskid devices may be so mounted.
Figure 2:
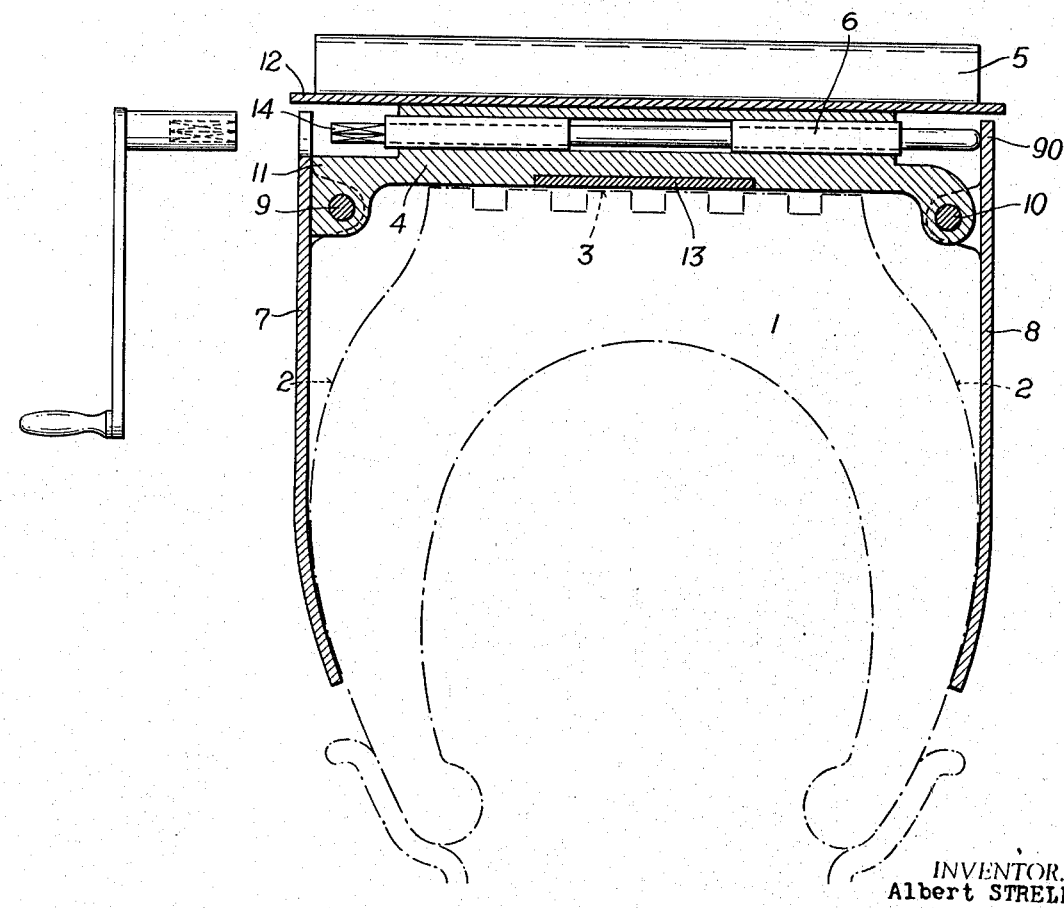
FIG. 2 is a sectional view of the device shown in FIG. 1.
Figure 3:
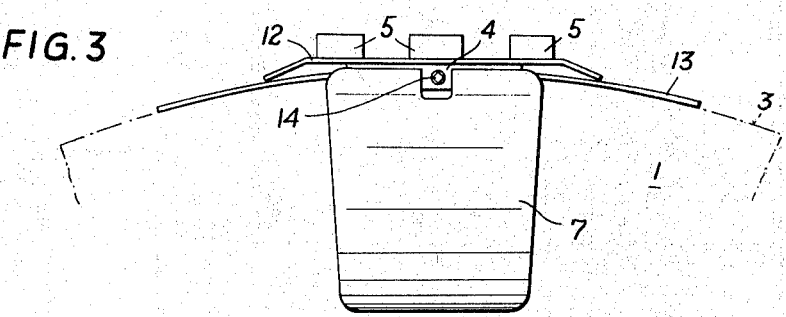
FIG. 3 is a side elevation showing the nonskid device according to FIG. 2.
Figure 4:
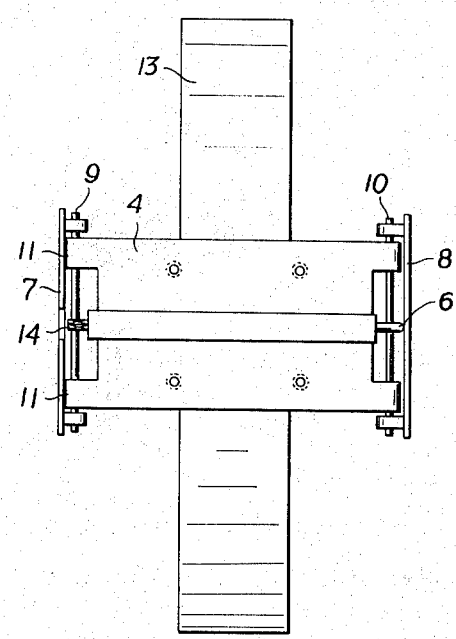
FIG. 4 is a top plan view showing the nonskid device according to FIG. 3, but without the pressure plate which carries the nonskid elements.
Figure 5:
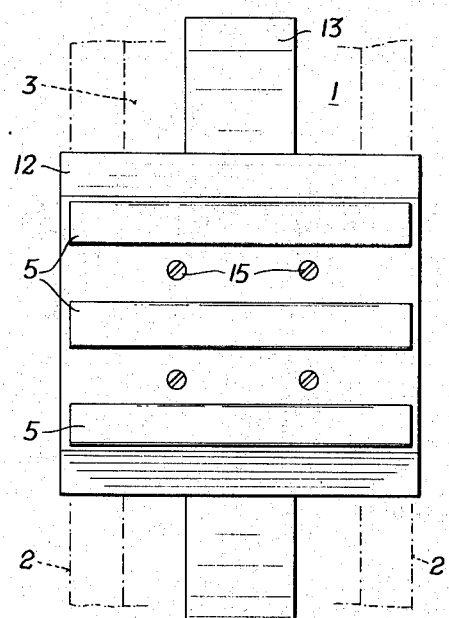
FIG. 5 is a top plan view like FIG. 4 and shows the nonskid device with the cover plate which carries the nonskid elements in position.
Figure 6:
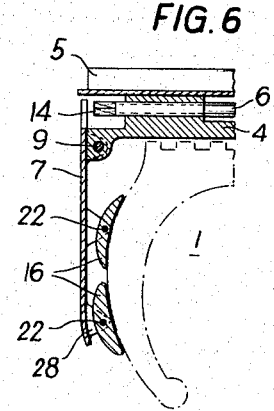
FIG. 6 is like FIG. 2 a sectional view showing the nonskid device but with pressure members between the sidewall of the tire and the gripping jaws.
Figure 8:
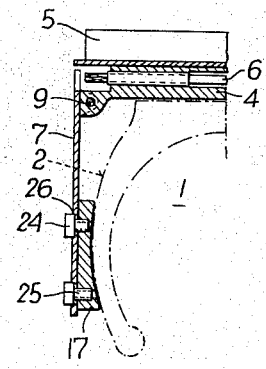

FIG. 8 a sectional view showing a gripping jaw which is provided with a pressure member, which is modified from that of FIG. 6.

Figure 9:
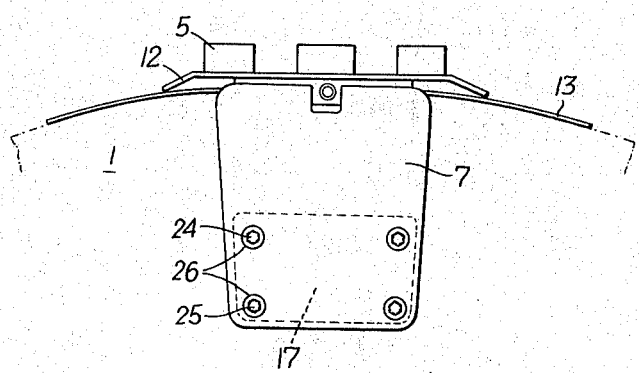

FIG. 9 is a side elevation showing the assembly of FIG. 8.

Figure 10:
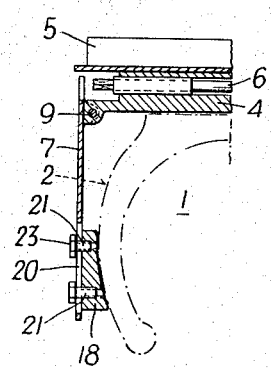

FIG. 10 is a sectional view showing a gripping jaw which is provided with a pressure member, which is modified from that of FIGS. 6 and 8.

Figure 11:
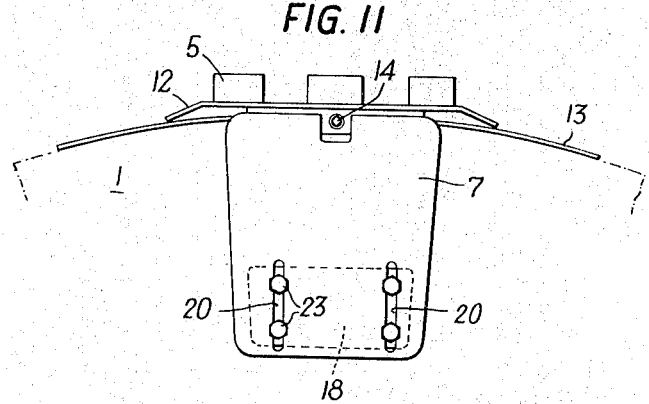

FIG. 11 is a side elevation showing the assembly of FIG. 10.

Figure 12:
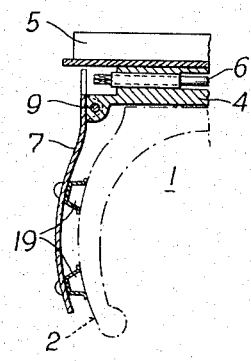

FIG. 12 is a sectional elevation showing a gripping jaw which is provided with a pressure member, which is modified from that of FIGS. 6 to 11.

Figure 13:
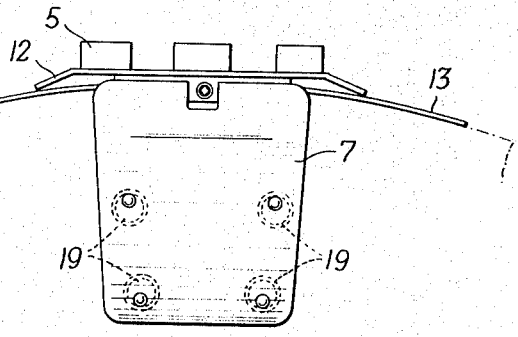

FIG. 13 is a side elevation showing the assembly of FIG. 12.

In the drawing, a vehicle tire 1 is shown, which is provided with a nonskid device according to the invention. The number of nonskid devices to be secured to a vehicle tire will be selected in view of the requirements. The nonskid device comprises two jaws 7 and 8, which are engageable with the sidewalls 2 of the tire 1. The jaws are adapted to be clamped against the tire 1 with the aid of a screw 6, which is rotatably mounted in a carrier 4, which extends across the tread 3 of the tire 1 and carries the nonskid elements 5. Each of the gripping jaws 7, 8 is mounted on a pivot 9 or 10. The pivots 9 and 10 are carried by opposite end portions of the carrier for the nonskid elements 5. One of the jaws 8 has an extension 90, which is engageable with the screw 6 at a distance from the pivot 10.

That jaw 7 which is not engageable with the screw 6 has an extension, which is engageable with an abutment 11 on the carrier 4 for the nonskid elements 5. In this case the extension of the jaw 7 limits the pivotal movement of the jaw 7 in the direction opposite to the clamping direction.

A cover plate 12 provided with the nonskid elements 5 is mounted on the carrier 4 for the nonskid elements 5. The cover plate 12 is secured to the carrier 4 by four screws 15. The nonskid elements 5 consisting of blocks may be secured to the cover plate 12 by vulcanization.

To prevent the nonskid device from tilting, a leaf spring 13 is provided on the inside of the carrier 4 for the nonskid elements 5 and extends transversely to the carrier 4 and the nonskid elements 5 and protrudes at both ends beyond the carrier 4 and the cover plate 12 in the peripheral direction of the tire. The spring 13 bears, in operation, on the tread 3 of the tire 1.

One end of the screw 6 is provided with a square formation or head, which is adapted to fit a wrench having a mating square recess and serving to fix the nonskid device to a vehicle tire 1.

As is shown in FIGS. 6 to 13, pressure members may be provided on the bodies of the gripping jaws 7 and 8 and are directly engageable with the sidewall 2 of the tire 1.

In accordance with FIGS. 6 to 11, the pressure member consists of a shoe, which has a surface conforming to the sidewall 2 of the tire. This shoe is designated 16 in FIGS. 6 and 7, 17 in FIGS. 8 and 9 and 18 in FIGS. 10 and 11.

According to FIGS. 10 and 11, a shoe 18 is slidable in a slot 20 formed in the body of each of the gripping jaws 7 and 8 and can be fixed to the body of the gripping jaw by means of screws 21, which extend through the slots 20 and are threadable into the shoe 18 and have a head 23 which engages the body of the gripping jaw.

According to FIGS. 8 and 9, the shoe is secured with screws 24 and 25 to the body of the gripping jaw 7 or 8. The heads of the screws are countersunk in a counterbore 26 or 27 in the body of the gripping jaw 7 or 8.

Figure 7:
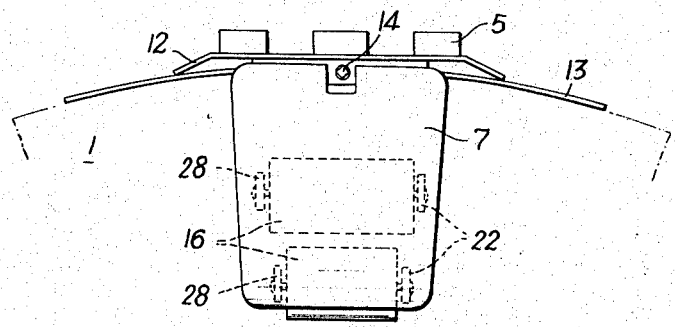
FIG. 7 is a side elevation showing the assembly of FIG. 6.

According to FIGS. 6 and 7, each friction shoe 16 is pivotally connected to the body of the respective gripping jaw 7 or 8 by pivot 22, which is parallel to the pivot 9 or 10 about which the jaw is pivotally movable. The pivot 22 is secured at its end in ears 68, which protrude from the body of the jaw 7 or 8 on that side which faces the tire 1.

According to FIGS. 12 and 13, the pressure member consists of a suction cup 19. Four of such suction cups are provided on the body of each gripping jaw, as is shown in FIG. 13. Each suction cup 19 is provided with a pin, which is adapted to be inserted into a bore in the body of the gripping jaw 7 or 8.

I claim:
1. A nonskid device for use with a vehicle tire, which comprises:
a rigid carrier adapted to extend across a tread of a vehicle tire;
nonskid means carried by said carrier along a side thereof opposite said tread;
a screw rotatably mounted in said carrier and extending transversely of the circumference of the tire in the longitudinal direction of the carrier;
two pivots mounted on opposite end portions of said carrier; and
two mutually facing gripping jaws pivotally connected to said carrier by said pivots, respectively, one of said jaws having an extension operatively engageable with said screw at a distance from the pivot associated with said one jaw;
said screw being rotatable for pivotal displacement of one of said jaws toward and away from the other so as to clamp said tire between and release said tire from said jaws.

2. A nonskid device as set forth in claim 1 wherein:
the other of said jaws is clear of said screw and provided with another extension; and
said carrier is provided with an abutment engageable by said other extension to limit the pivotal movement of said other jaw in the direction away from said one jaw.

3. A nonskid device as set forth in claim 1 wherein said carrier comprises a cover plate mounting said nonskid means.

4. A nonskid device as set forth in claim 1 wherein:
a leaf spring is provided on the inside of said carrier and extends transversely to said carrier; and
said leaf spring protrudes beyond said carrier in the peripheral direction of the tire and beyond both edges and is positioned to bear on said tread to prevent a tilting of the device.

5. A nonskid device as set forth in claim 1 wherein at least one of said jaws comprises at least one pressure member which is adapted to matingly engage a sidewall of said tire.

6. A nonskid device as set forth in claim 5 wherein:
at least one of said gripping jaws is formed with a bore; and
said one gripping jaw is provided with said pressure member, said pressure member consisting of a vacuum cup having a pin received in said bore.

7. A nonskid device as set forth in claim 5 wherein said pressure member consists of a shoe.

8. A nonskid device as set forth in claim 7 wherein said at least one gripping jaw is formed with slots, said shoe is slidable in said slots and screws are provided which extend through said slots and secure said shoe to said gripping jaw.

9. A nonskid device as set forth in claim 7 wherein said at least one gripping jaw comprises a body which is connected to said carrier by the respective pivot, and said shoe is pivotally connected to said body by a second pivot, which is parallel to the pivot which connects said body to said carrier.